(12) United States Patent
Mizoguchi et al.

(10) Patent No.: US 10,088,873 B2
(45) Date of Patent: Oct. 2, 2018

(54) CHASSIS STRUCTURE FOR PORTABLE ELECTRONIC DEVICES

(71) Applicant: LENOVO (SINGAPORE) PTE. LTD., Singapore (SG)

(72) Inventors: Fumitake Mizoguchi, Kanagawa-ken (JP); Ryota Nohara, Kanagawa-ken (JP); Takehito Yamauchi, Kanagawa-ken (JP); Ryo Otsuka, Kanagawa-ken (JP)

(73) Assignee: LENOVO (SINGAPORE) PTD LTE, Singapore (SG)

( * ) Notice: Subject to any disclaimer, the term of this patent is extended or adjusted under 35 U.S.C. 154(b) by 0 days.

(21) Appl. No.: 15/702,392

(22) Filed: Sep. 12, 2017

(65) Prior Publication Data
US 2018/0004255 A1   Jan. 4, 2018

Related U.S. Application Data

(63) Continuation of application No. 15/004,665, filed on Jan. 22, 2016.

(30) Foreign Application Priority Data

Jan. 23, 2015   (JP) .................. 2015-011390

(51) Int. Cl.
*G06F 1/16* (2006.01)
*G02F 1/1333* (2006.01)

(52) U.S. Cl.
CPC ...... *G06F 1/1656* (2013.01); *G02F 1/133308* (2013.01); *G06F 1/1616* (2013.01); *G06F 1/1637* (2013.01)

(58) Field of Classification Search
CPC . G02F 1/133308; G02F 1/1637; G02F 1/1656
See application file for complete search history.

(56) References Cited

U.S. PATENT DOCUMENTS 4,359,707 A * 11/1982 Spannhake ........... H01J 29/003
                                                      335/284
5,867,370 A *  2/1999 Masuda .............. B29C 45/0013
                                                      174/377

(Continued)

FOREIGN PATENT DOCUMENTS

JP   2001-287291 A   10/2001
JP   2005-128804 A    5/2005

(Continued)

*Primary Examiner* — Adrian S Wilson
(74) *Attorney, Agent, or Firm* — Antony P. Ng; Russell Ng PLLC (57) ABSTRACT

A chassis structure is disclosed. A chassis includes a plate-like body in which a foam layer is located between a pair of fiber-reinforced resin plates, and a frame body formed of a thermoplastic resin and joined to a peripheral portion of the plate-like body. The plate-like body is configured such that its peripheral portion is formed by an ear-like joint portion where the pair of fiber-reinforced resin plates are joined together without the foam layer located therebetween, thereby sealing the foam layer inside the pair of fiber-reinforced resin plates. The frame body is joined to the plate-like body in a state where the frame body is in contact with the joint portion.

2 Claims, 6 Drawing Sheets (56) References Cited

U.S. PATENT DOCUMENTS

| | | | | |
|---|---|---|---|---|
| 6,085,965 A * | 7/2000 | Schwartz | B22F 7/006 | 228/190 |
| 6,456,499 B1 * | 9/2002 | Nakajima | G06F 1/1616 | 174/255 |
| 6,480,397 B1 * | 11/2002 | Hsu | H04B 1/3833 | 361/752 |
| 6,509,877 B2 * | 1/2003 | Masaki | G06F 1/1616 | 343/702 |
| 6,642,892 B2 * | 11/2003 | Masaki | H01Q 1/2266 | 343/700 MS |
| 6,809,690 B2 * | 10/2004 | Tao | G06F 1/1616 | 343/702 |
| 6,879,293 B2 * | 4/2005 | Sato | G06F 1/1616 | 343/700 MS |
| 6,935,766 B2 * | 8/2005 | Ato | G02B 6/0031 | 349/58 |
| 8,379,164 B2 * | 2/2013 | Ji | B29C 45/0001 | 348/794 |
| 8,576,372 B2 * | 11/2013 | Ji | B29C 45/0001 | 348/794 |
| 9,400,529 B2 * | 7/2016 | Chang | H04M 1/0277 | |
| 2004/0203488 A1 * | 10/2004 | Sullivan | B29C 45/0053 | 455/90.1 |
| 2005/0237443 A1 * | 10/2005 | Nakanishi | G02F 1/133308 | 349/58 |
| 2008/0039160 A1 * | 2/2008 | Homer | H01Q 1/12 | 455/575.7 |
| 2009/0179806 A1 * | 7/2009 | Ji | G06F 1/1616 | 343/702 |
| 2009/0185340 A1 * | 7/2009 | Ji | B29C 45/14786 | 361/679.21 |
| 2009/0194326 A1 * | 8/2009 | Morimoto | H04M 1/026 | 174/535 |
| 2010/0039578 A1 * | 2/2010 | Roh | G02F 1/133604 | 349/58 |
| 2010/0048257 A1 * | 2/2010 | Prest | B29C 45/14336 | 455/575.1 |
| 2010/0238621 A1 * | 9/2010 | Tracy | B29C 45/14639 | 361/679.27 |
| 2010/0289390 A1 * | 11/2010 | Kenney | B29C 43/006 | 312/223.1 |
| 2013/0147079 A1 * | 6/2013 | Ji | B29C 45/14786 | 264/105 |
| 2013/0285516 A1 * | 10/2013 | Mizoguchi | H05K 5/02 | 312/7.2 |
| 2016/0259366 A1 * | 9/2016 | Kenney | G06F 1/1601 | |

FOREIGN PATENT DOCUMENTS

| | | |
|---|---|---|
| JP | 2008-3714 A | 1/2008 |
| JP | 2011-165206 A | 8/2011 |
| JP | 2013-232052 A | 11/2013 |

* cited by examiner

CHASSIS STRUCTURE FOR PORTABLE ELECTRONIC DEVICES

RELATED APPLICATIONS

The present application is a continuation of U.S. application Ser. No. 15/004,665, filed Jan. 22, 2016, the contents of which are incorporated herein by reference.

PRIORITY CLAIM

The present application claims benefit of priority under 35 U.S.C. §§ 120, 365 to the previously filed Japanese Patent Application No. JP2015-011390 with a priority date of Jan. 23, 2015, which is incorporated by reference herein.

BACKGROUND OF THE INVENTION

1. Technical Field

The present invention relates to electronic devices in general, and particularly to a structure that can be applied to a chassis of an electronic device.

2. Description of Related Art

Chassis of various electronic devices, such as laptop personal computers (laptop PCs), tablet personal computers (tablet PCs), mobile phones, etc., should be thin, light, and strong. In view of this, a plate-like chassis material in which a foam layer is "sandwiched" between prepreg plates (fiber-reinforced resin plates) having reinforcing fibers such as carbon fibers impregnated with a thermosetting resin such as an epoxy resin is widely used for the chassis of electronic devices.

According to the prior art, an anchor effect is generated by injection-molding the thermoplastic resin on the end face of the plate-like body to cause the thermoplastic resin to enter the foam layer sandwiched between the fiber-reinforced resin plates so that high joining strength can be obtained. However, with this structure, it is difficult to control the amount of the thermoplastic resin entering the foam layer, which complicates the manufacturing management process.

Consequently, it would be desirable to provide an improved chassis structure that allows for a simpler manufacturing management process.

SUMMARY OF THE INVENTION

In accordance with a preferred embodiment of the present invention, a chassis structure includes a plate-like body in which a foam layer is located between a pair of fiber-reinforced resin plates, and a frame body formed of a thermoplastic resin and is joined to a peripheral portion of the plate-like body. The plate-like body is configured such that the peripheral portion of the plate-like body is formed by an ear-like joint portion where the pair of fiber-reinforced resin plates are joined together without the foam layer located therebetween, thereby sealing the foam layer inside the pair of fiber-reinforced resin plates. The frame body is joined to the plate-like body in a state where the frame body is in contact with the joint portion.

With this configuration, since the foam layer is sealed between the pair of fiber-reinforced resin plates, the thermoplastic resin forming the frame body does not enter the foam layer when the frame body is being joined to the plate-like body. As a result, the manufacturing process of the chassis is much simpler, and the manufacturing cost can also be reduced. Further, since the plate-like body and the frame body are joined together by contacting the frame body with the joint portion provided in the peripheral portion of the plate-like body, the contact area between the plate-like body and the frame body can be sufficiently ensured so that high joining strength can be obtained therebetween.

The flat plate portion may extend to an edge of at least a part of the chassis material. Accordingly, high strength can be ensured over the entire external shape of the chassis material, and since a seam between the fiber-reinforced resin plates and the frame body does not appear on the outer surface, the external appearance quality becomes even higher. As a result, it is possible to reduce or eliminate a post-treatment step, such as a surface treatment, for covering the seam.

The joint portion may have a bent portion formed by bending the flat plate portion at the edge of the chassis material and the frame body may be joined to an inner surface of the bent portion. Accordingly, since the outer surface of the chassis and an outer surface of a side surface of the chassis can be integrally formed by the fiber-reinforced resin plates, it is possible to achieve even higher strength.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
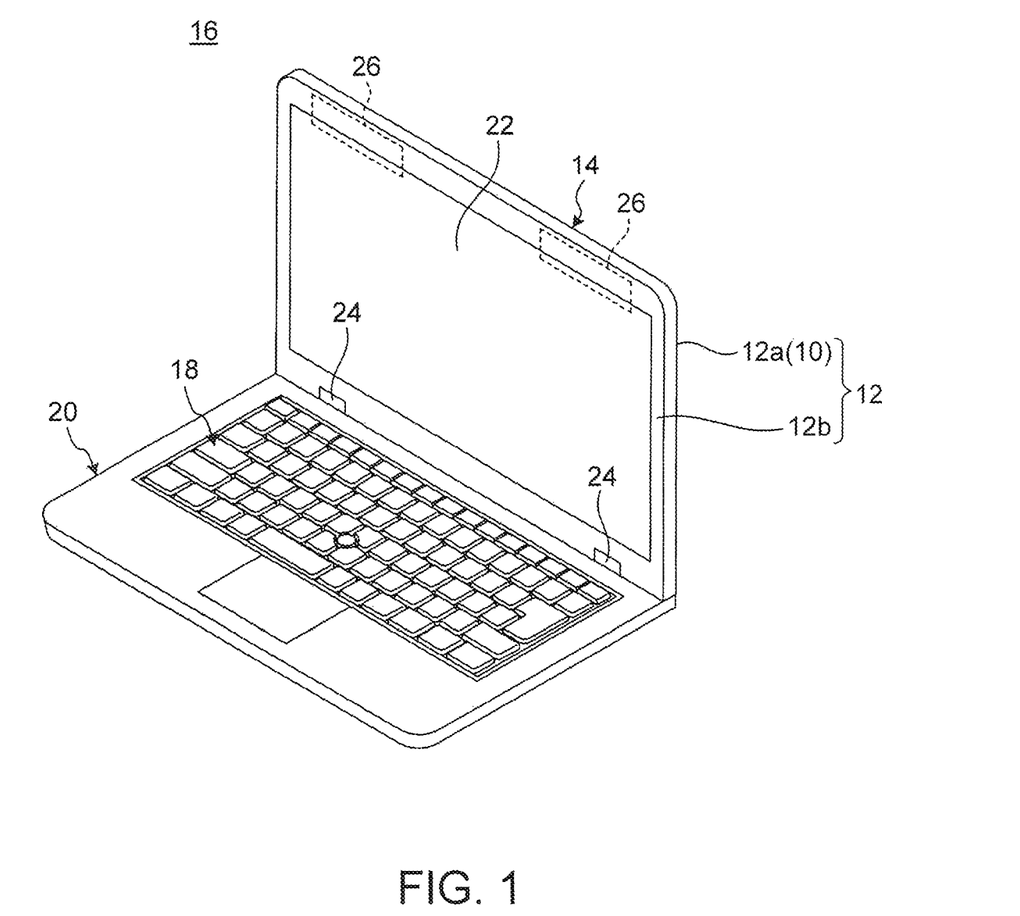
FIG. 1 is a perspective view of an electronic device having a chassis formed of a chassis structure according to a preferred embodiment of the present invention.

Referring now to the drawings and in particular to FIG. 1, there is depicted a perspective view of an electronic device 16 having a lid 14 constituted by an electronic device chassis 12 formed of a chassis material 10, according to a preferred embodiment of the present invention. In this embodiment, there is shown by way of example a configuration in which the electronic device chassis 12 formed of the chassis material 10 is applied to the lid 14 of the electronic device 16 as a laptop PC. As shown, the electronic device 16 includes a device body 20 having a keyboard device 18, and the rectangular flat plate-like lid 14 having a display device 22 composed of a liquid crystal display and so on, and is of the clamshell type in which the lid 14 is coupled to the device body 20 via left and right hinges 24 so as to be openable and closable. Various electronic components, not illustrated, such as a board, an arithmetic processing unit, a hard disk device, and a memory, are housed in the device body 20.

The lid 14 includes the electronic device chassis 12 having a back cover 12a and a front cover 12b. The back cover 12a is a cover member covering side surfaces and a back surface of the lid 14 and is formed of the chassis material 10 according to this embodiment. The front cover 12b is a resin cover member covering a front surface of the lid 14 jointly with the display device 22. A pair of left and right antennas 26, 26 are provided in the electronic device chassis 12 near its upper end portion. The antennas 26, 26 are used for transmission and reception of radio waves that are used in wireless communications and so on.

Next, the configuration of the back cover 12a of the lid 14 and the chassis material 10 forming the back cover 12a will be described in detail.

Figure 2:
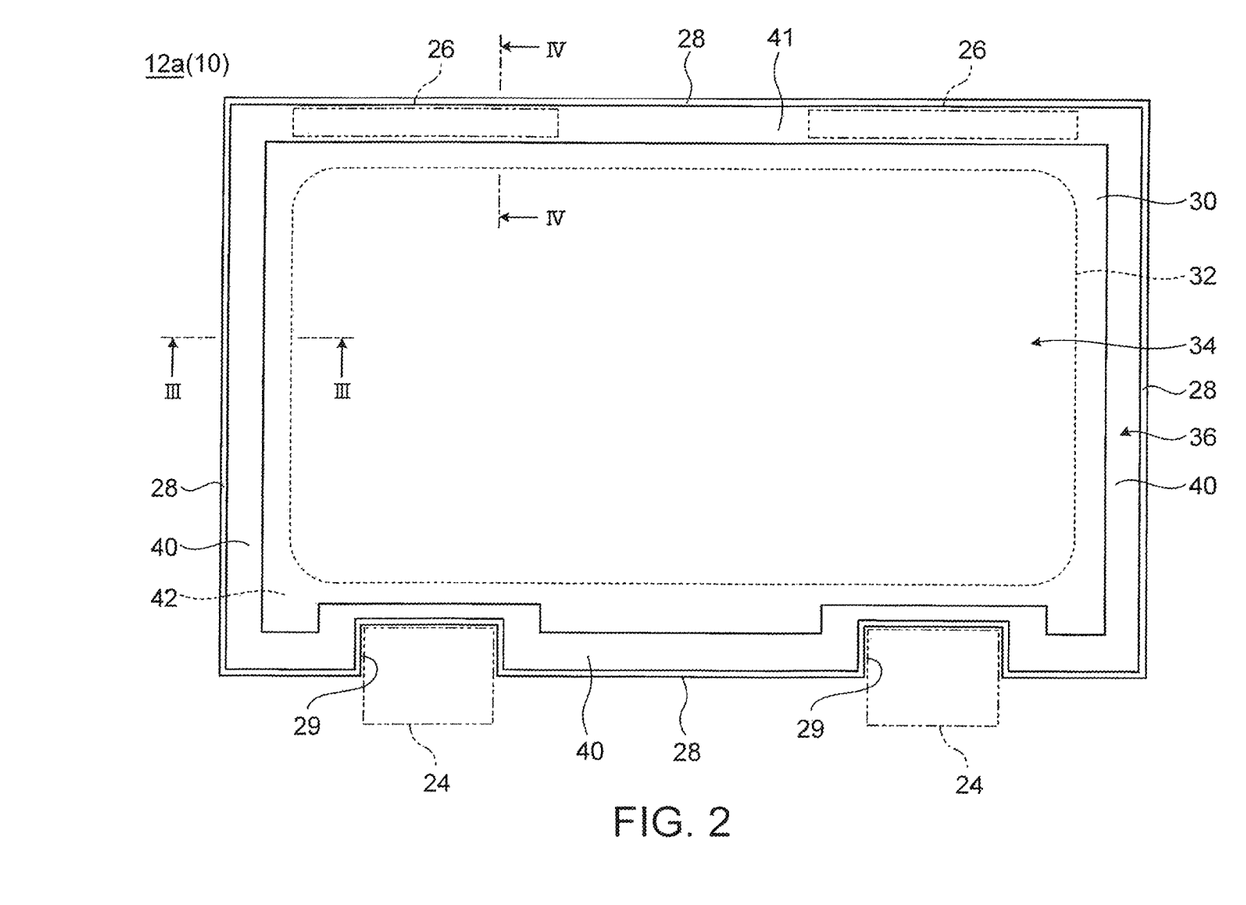
FIG. 2 is a plan view of a back cover of the lid of the electronic device from FIG. 1.

The overall configuration of the back cover 12a will be described. FIG. 2 is a plan view showing the configuration of the back cover 12a of the lid 14 and showing the inner side of the back cover 12a where the display device 22 is received.

As described above, the back cover 12a is formed of the chassis material 10. As shown in FIG. 2, the back cover 12a is a panel-like cover member in which a wall portion 28 is formed upright on the periphery thereof to serve as side surfaces of the electronic device chassis 12 along its four sides.

The antennas 26 are provided on an inner surface of the back cover 12a at its upper edge portion. A pair of recesses 29 in which the hinges 24 are respectively disposed are cutout-formed at a lower edge portion of the back cover 12a.

Figure 3:
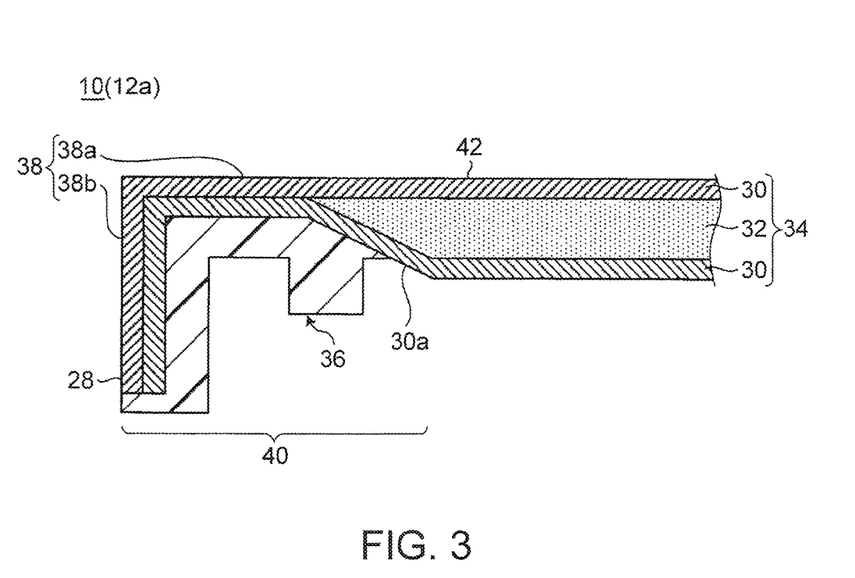
FIG. 3 is a cross-sectional view taken along line of FIG. 2.

Next, a specific configuration of the chassis material 10 forming the back cover 12a will be described. FIG. 3 is a cross-sectional view taken along line III-III of FIG. 2 and FIG. 4 is a cross-sectional view taken along line IV-IV of FIG. 2.

Figure 4:
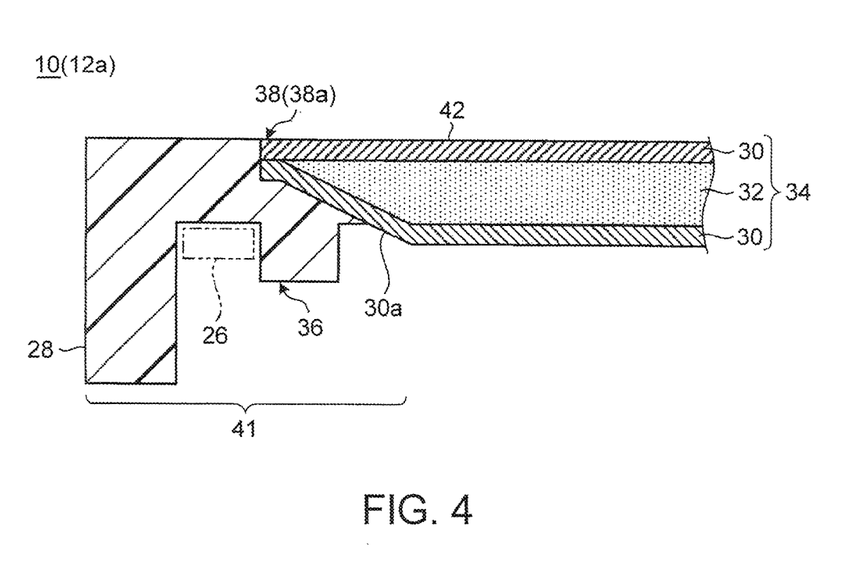
FIG. 4 is a cross-sectional view taken along line Iv-Iv of FIG. 2.

As shown in FIGS. 2 to 4, the chassis material 10 includes a plate-like body 34 of a stacked structure in which a foam layer 32 is sandwiched between a pair of upper and lower fiber-reinforced resin plates (prepreg layers) 30 and a frame body 36 joined to peripheral portions 40, 41 of the plate-like body 34.

Each fiber-reinforced resin plate 30 is a prepreg in which reinforcing fibers are impregnated with a thermosetting resin such as an epoxy resin. In this embodiment, it is made of a carbon fiber-reinforced resin (CFRP) using carbon fibers as the reinforcing fibers. The reinforcing fibers may be other than the carbon fibers and may be made of any of various materials, for example, metal fibers such as stainless steel fibers and inorganic fibers such as glass fibers.

The foam layer 32 is a soft spacer provided between the pair of fiber-reinforced resin plates 30 and serving to space these hard fiber-reinforced resin plates 30 from each other. By providing the foam layer 32, the section modules of the plate-like body 34 in its thickness direction increases to create a light and strong structure. The foam layer 32 is formed by, for example, a foam sheet of polypropylene or the like.

As shown in FIGS. 3 and 4, the plate-like body 34 has a structure such that its peripheral portions along its four sides are formed by an ear-like joint portion 38 where the pair of fiber-reinforced resin plates 30 are joined together without sandwiching the foam layer 32 therebetween, thereby sealing the foam layer 32 inside the pair of fiber-reinforced resin plates 30. The joint portion 38 is obtained by joining the fiber-reinforced resin plates 30 together by pressing when forming the plate-like body 34. The plate-like body 34 may have a stacked structure of five or more layers in which foam layers 32 are respectively sandwiched between adjacent two of three or more fiber-reinforced resin plates 30. In this case, the joint portion 38 is formed by joining the three or more fiber-reinforced resin plates 30 together.

The peripheral portions along the four sides of the plate-like body 34 of this embodiment differ in structure between the upper edge portion (upper side), where the antennas 26 are disposed, of the back cover 12a and the other left and right side edge portions (left and right sides) and lower edge portion (lower side) of the back cover 12a.

As shown in FIG. 3 (see also FIG. 2), in the peripheral portion 40 along the left side, the right side, and the lower side other than the upper side where the antennas 26 are disposed, the joint portion 38 has a flat plate portion 38a flush with and extending along an outer surface 42 of the chassis material 10 (back cover 12a) and a bent portion 38b formed by bending the flat plate portion 38a perpendicularly inward of the back cover 12a at the edge. The length of the flat plate portion 38a may be set to substantially zero and the bent portion 38b may be formed by bending the joint portion 38 near the boundary with the foam layer 32. The fiber-reinforced resin plate 30 on the inner side (lower side in FIG. 3) of the plate-like body 34 is formed, near the joint portion 38, with an inclined surface 30a inclined toward the outer-side fiber-reinforced resin plate 30.

The frame body 36 is joined to the plate-like body 34 by injection-molding a thermoplastic resin on inner surfaces of the flat plate portion 38a, the bent portion 38b, and the inclined surface 30a. The frame body 36 is a frame-like portion where non-illustrated screw holes, rib shapes, and so on for attaching the front cover 12b are formed. As the thermoplastic resin forming the frame body 36, it is preferable to use, for example, a polyethylene resin or a polypropylene resin, or use may be made of a fiber-reinforced resin (e.g., GFRP) in which such a resin contains reinforcing fibers such as glass fibers. In this embodiment, the frame body 36 is formed of a non-conductive material.

Accordingly, in the peripheral portion 40 shown in FIG. 3, the flat plate portion 38a of the joint portion 38 where the fiber-reinforced resin plates 30, 30 are joined together extends to the outer edge of the chassis material 10 and the frame body 36 is joined to the inner side thereof. Further, the outer surface of the wall portion 28 of the peripheral portion 40 is mostly formed by the bent portion 38b of the joint portion 38 and the frame body 36 is joined to the inner side thereof.

Consequently, in the peripheral portion 40, the joining area (contact area) between the fiber-reinforced resin plates 30 and the frame body 36 can be sufficiently ensured by the joint portion 38, and therefore, the plate-like body 34 and the frame body 36 can be joined together with high joining strength. Further, since the outer surface 42 of the chassis material 10 is formed to reach the edge by the high-strength fiber-reinforced resin plates 30 and the lower-strength frame body 36 is joined to the inner side thereof, it is possible to ensure the strength of the entire peripheral portion 40. Further, since a seam between the fiber-reinforced resin plates 30 and the frame body 36 does not appear on the outer surface 42, the external appearance quality is high, and since a post-treatment such as a surface treatment for covering the seam is not required, the manufacturing cost can be reduced.

Next, as shown in FIG. 4 (also in FIG. 2), in the peripheral portion 41 along the upper side where the antennas 26 are disposed, the joint portion 38 has a flat plate portion 38a flush with the outer surface 42 of the chassis material 10 (back cover 12a) and extending slightly from an end portion of the foam layer 32 along the outer surface 42. Therefore, differently from the flat plate portion 38a of the peripheral portion 40 shown in FIG. 3, the flat plate portion 38a of the peripheral portion 41 does not reach the edge of the chassis material 10. Also in the peripheral portion 41, the fiber-reinforced resin plate 30 on the inner side (lower side in FIG. 4) of the plate-like body 34 is formed with an inclined surface 30a.

The frame body 36 is joined to the plate-like body 34 by injection-molding the thermoplastic resin on an inner surface and an end face of the flat plate portion 38a and an inner surface of the inclined surface 30a. In the case of this configuration, the frame body 36 is formed so as to be flush with and extend along the outer surface 42 of the back cover 12a and to protrude inward of the back cover 12a at the edge.

Therefore, in the peripheral portion 41 shown in FIG. 4, the flat plate portion 38a of the joint portion 38 where the fiber-reinforced resin plates 30 are joined together does not extend to the edge of the chassis material 10 and the frame body 36 is joined to the inner side and the lateral side thereof. Further, the wall portion 28 of the peripheral portion 41 is formed by the frame body 36 and the antennas 26 are provided on the inner side of the wall portion 28.

Consequently, in the peripheral portion 41, although smaller than in the case of the peripheral portion 40, the joining area (contact area) between the fiber-reinforced resin plates 30 and the frame body 36 can be sufficiently ensured by the joint portion 38, and therefore, the plate-like body 34 and the frame body 36 can be joined together with high joining strength. Further, since the fiber-reinforced resin plates 30 made of the conductive material are not disposed on the outer side of the antennas 26 and instead the frame body 36 made of the non-conductive material is disposed, high sensitivity of the antennas 26 is ensured. In the case where the antennas 26 are not required to be disposed due to a specification of the electronic device 16 or the like, the peripheral portion 41 may have the same structure as the peripheral portion 40 shown in FIG. 3.

Figure 5:
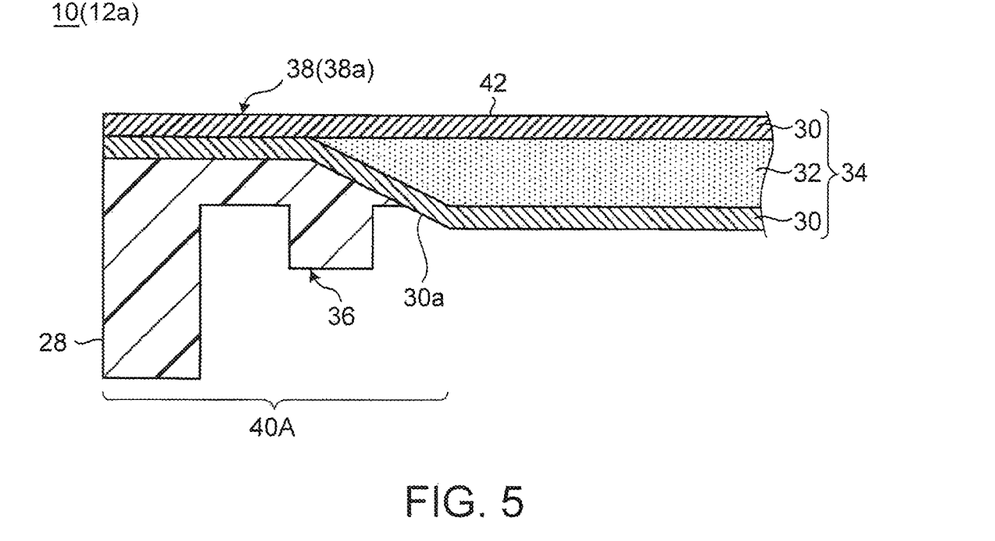
FIG. 5 is a cross-sectional view showing a peripheral portion according to a modification of a peripheral portion shown in FIG. 3.

The shapes of the peripheral portions 40, 41 may of course be other than those shown in FIGS. 3 and 4. For example, the peripheral portion 40 may be a peripheral portion 40A having a shape with the bent portion 38b omitted as shown in FIG. 5. In the peripheral portion 40A, a flat plate portion 38a of a joint portion 38 extends to the edge of a chassis material 10 and a frame body 36 is joined to the inner side of the flat plate portion 38a.

Figure 6:
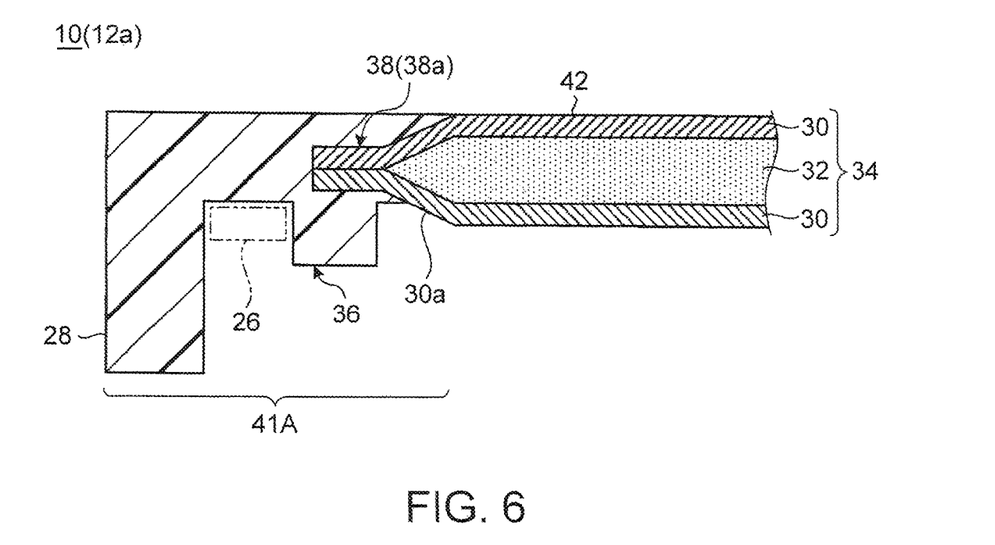
FIG. 6 is a cross-sectional view showing a peripheral portion according to a modification of a peripheral portion shown in FIG. 4.

For example, the peripheral portion 41 may be a peripheral portion 41A in which a flat plate portion 38a of a joint portion 38 is formed stepped from an outer surface 42 of a chassis material 10 as shown in FIG. 6. In the peripheral portion 41A, compared to the peripheral portion 41 shown in FIG. 4, a frame body 36 is joined also to the outer side of the flat plate portion 38a in addition to the inner side and the lateral side thereof and therefore the joining strength of the frame body 36 to the plate-like body 34 becomes even higher.

Figure 7:
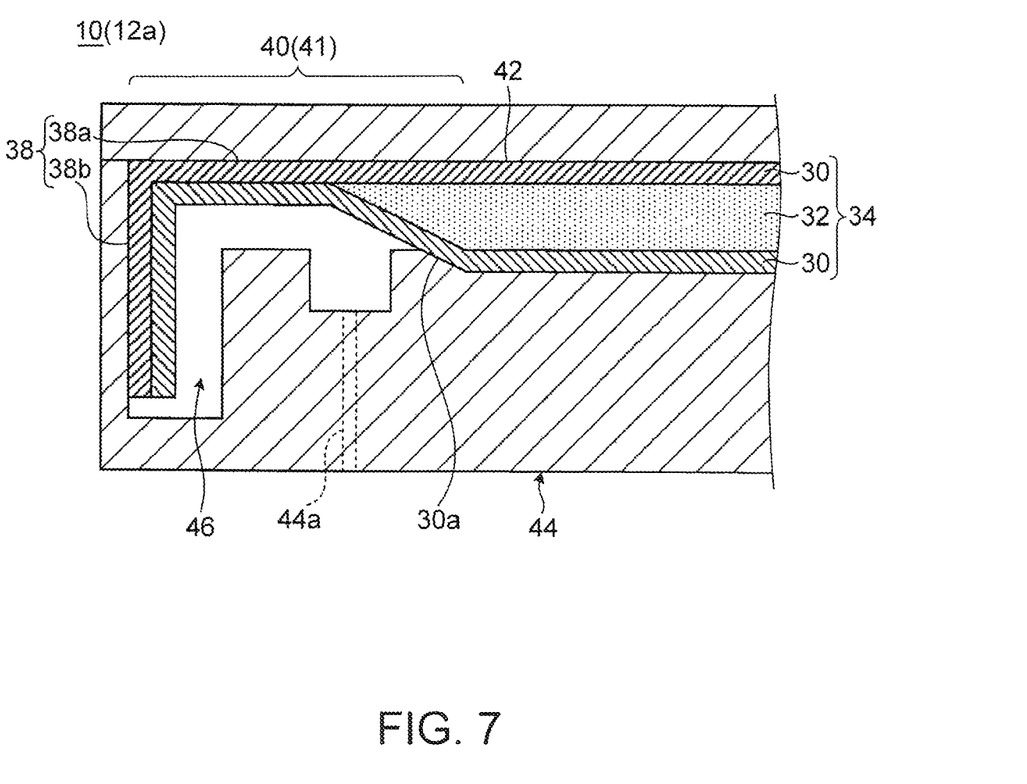
FIG. 7 is a cross-sectional view for explaining a method of manufacturing the chassis structure according to a preferred embodiment of the present invention.

FIG. 7 is a cross-sectional view for explaining a method of manufacturing the chassis material 10, according to a preferred embodiment of the present invention. When manufacturing the chassis material 10, first, a pair of planar fiber-reinforced resin plates 30, each having a predetermined external shape (e.g., a rectangular shape) are prepared, then a planar foam layer 32 (e.g., a foam sheet) having a predetermined external shape (e.g., a rectangular shape) smaller than each of the fiber-reinforced resin plates 30 is sandwiched therebetween, and then the three layers (i.e., two resin plates 30 and one foam layer 32) are pressed in a stacking direction thereof. In this event, a plate-like body 34 of a sandwich structure is formed in which the foam layer 32 is sealed inside by an ear-like joint portion 38 that is formed in peripheral portions 40, 41 by pressing together the pair of fiber-reinforced resin plates 30 at portions where the foam layer 32 is not sandwiched therebetween.

Subsequently, as shown in FIG. 7, the plate-like body 34 is set in a mold 44 and then a molten thermoplastic resin is injected into a cavity 46 through an injection port 44a, thereby injection-molding the thermoplastic resin so as to be in contact with the joint portion 38 of the plate-like body 34. Although FIG. 7 shows by way of example a method of manufacturing the peripheral portion 40 shown in FIG. 3, this can also be applied, almost as it is, to a method of manufacturing the peripheral portion 41 shown in FIG. 4. As a result, as shown in FIGS. 3 and 4, a frame body 36 is formed at the peripheral portions 40, 41 of the plate-like body 34 so that the chassis material 10 is formed.

As described above, in the chassis material 10 according to the present embodiment, the plate-like body 34 is configured such that its peripheral portions 40 (40A), 41 (41A) are formed by the ear-like joint portion 38 where the pair of fiber-reinforced resin plates 30, 30 are joined together without sandwiching the foam layer 32 therebetween, thereby sealing the foam layer 32 inside (at a central portion of) the pair of fiber-reinforced resin plates 30, 30, while the frame body 36 is joined to the plate-like body 34 in the state where the frame body 36 is in contact with the joint portion 38.

Accordingly, since the foam layer 32 is sealed between the fiber-reinforced resin plates 30, the thermoplastic resin forming the frame body 36 does not enter the foam layer 32 when joining the frame body 36 to the plate-like body 34, and therefore, the manufacturing management thereof is easy and thus the manufacturing cost thereof can be reduced. Further, since the plate-like body 34 and the frame body 36 are joined together by contacting the frame body 36 with the joint portion 38 provided in the peripheral portions 40, 41 of the plate-like body 34, the contact area between the plate-like body 34 and the frame body 36 can be sufficiently ensured to obtain high joining strength therebetween so that the strength of the chassis material 10 also becomes high.

The joint portion 38 has the flat plate portion 38a extending along the outer surface 42 of the chassis material 10 and the frame body 36 is joined to the inner surface of the flat plate portion 38a (see FIGS. 3 to 6). Accordingly, the outer surface 42 of the chassis material 10 is formed to be planar by the flat plate portion 38a (and the frame body 36) so that the external appearance quality is high. Herein, in the peripheral portions 40, 40A shown in FIGS. 3 and 5, the flat plate portion 38a extends to the edge of the chassis material 10. Therefore, high strength can be ensured over the entire external shape of the chassis material 10 and, further, since a seam between the fiber-reinforced resin plates 30, 30 and the frame body 36 does not appear on the outer surface 42, the external appearance quality becomes even higher and it is possible to reduce or eliminate a post-treatment such as a surface treatment for covering the seam.

In this case, in the peripheral portion 40 shown in FIG. 3, the joint portion 38 has the bent portion 38*b* formed by bending the flat plate portion 38*a* at the edge and the frame body 36 is joined also to the inner surface of the bent portion 38*b*. In other words, according to the chassis material 10, by providing the joint portion 38 having no foam layer 32 in the peripheral portion 40 of the plate-like body 34, it is possible to draw the joint portion 38 to form the bent portion 38*b* without being hindered by the foam layer 32. Consequently, since the outer surface 42 of the chassis material 10 and the outer surface of the wall portion 28 serving as the side surface of the chassis material 10 can be integrally formed by the fiber-reinforced resin plates 30, it is possible to achieve even higher strength and to further reduce a post-treatment such as a surface treatment.

As has been described, the present disclosure provides an improved chassis structure that allows for a simpler manufacturing management process.

The present invention is not limited to the above-described embodiment and changes can of course be made freely within a range not departing from the gist of the present invention. For example, in the above-described embodiment, there is shown by way of example the configuration in which the chassis material 10 is used as the electronic device chassis 12 of the lid 14 forming the electronic device 16, but the chassis material 10 may be used for the device body 20.

Figure 8:
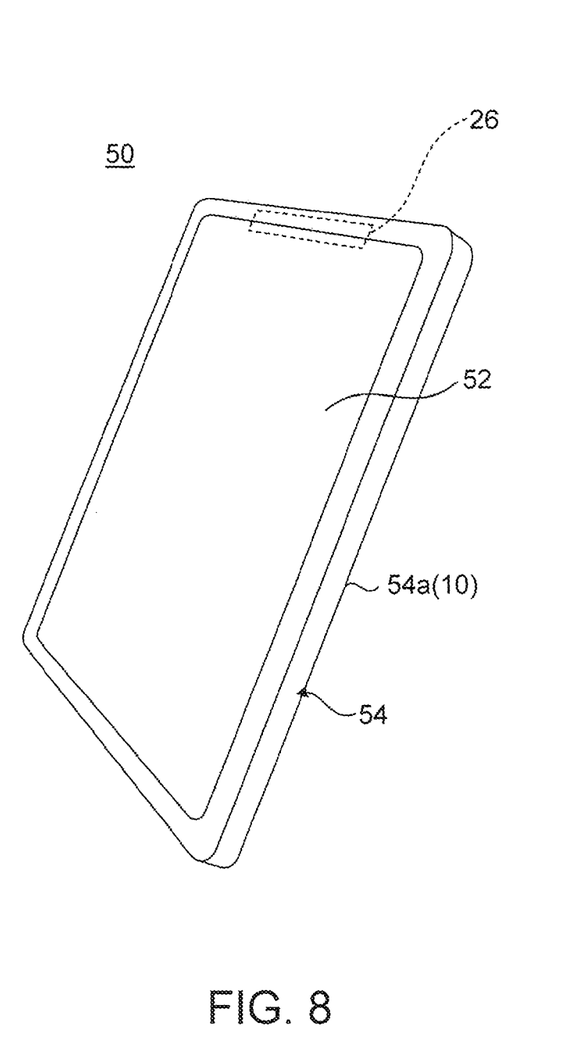
FIG. 8 is a perspective view showing the chassis structure used as a back cover of a tablet PC.

Further, the chassis material 10 can be used as a chassis material of various electronic devices such as a tablet PC, a desktop PC, a smartphone, and a cellular phone, other than the laptop PC. For example, as shown in FIG. 8, in the case of an electronic device 50 as a tablet PC, since it has a touch-operable display device 52 at the front of an electronic device chassis 54, a rectangular flat plate-like back cover (back plate) 54*a* is preferably formed of a chassis material 10. In this event, preferably, the upper side, where an antenna 26 is provided, of the electronic device chassis 54 has the same structure as the peripheral portion 41 shown in FIG. 4, while the other three sides of the electronic device chassis 54 have the same structure as the peripheral portion 40 shown in FIG. 3.

While the disclosure has been particularly shown and described with reference to a preferred embodiment, it will be understood by those skilled in the art that various changes in form and detail may be made therein without departing from the spirit and scope of the disclosure.

What is claimed is:

1. A chassis comprising:
a frame body formed of a thermoplastic resin;
a first edge of a plate-like body having a first section and a second section with a first inclined surface near said first section, wherein said first section includes a pair of fiber-reinforced resin plates, and said second section includes a foam layer located between said pair of fiber-reinforced resin plates, wherein said first edge of said plate-like body is joined to said frame body at an inner surface of said first section and at said first inclined surface of said second section; and
a second edge of said plate-like body having said second section with a second inclined surface, wherein said second edge of said plate-like body is joined to said frame body at said second inclined surface of said second section.

2. A portable electronic device comprising:
a body chassis containing a keyboard; and
a cover chassis containing a display, wherein said cover chassis includes
a frame body formed of a thermoplastic resin;
a first edge of a plate-like body having a first section and a second section with a first inclined surface near said first section, wherein said first section includes a pair of fiber-reinforced resin plates, and said second section includes a foam layer located between said pair of fiber-reinforced resin plates, wherein said first edge of said plate-like body is joined to said frame body at an inner surface of said first section and at said first inclined surface of said second section; and
a second edge of said plate-like body having said second section with a second inclined surface, wherein said second edge of said plate-like body is joined to said frame body at said second inclined surface of said second section.

* * * * *